US009122036B2

(12) United States Patent
Yoshida et al.

(10) Patent No.: US 9,122,036 B2
(45) Date of Patent: Sep. 1, 2015

(54) OPTICAL FIBER CLAMP AND METHOD OF CLAMPING OPTICAL FIBER

(71) Applicant: FUJIKURA LTD., Koto-ku, Tokyo (JP)

(72) Inventors: Kensuke Yoshida, Sakura (JP); Katsumi Sasaki, Sakura (JP); Takeshi Sato, Sakura (JP); Manabu Tabata, Sakura (JP)

(73) Assignee: FUJIKURA LTD., Tokyo (JP)

( * ) Notice: Subject to any disclaimer, the term of this patent is extended or adjusted under 35 U.S.C. 154(b) by 303 days.

(21) Appl. No.: 13/744,010

(22) Filed: Jan. 17, 2013

(65) Prior Publication Data

US 2013/0129301 A1    May 23, 2013

Related U.S. Application Data

(63) Continuation of application No. PCT/JP2011/051250, filed on Jan. 24, 2011.

(51) Int. Cl.
*G02B 6/00* (2006.01)
*G02B 6/46* (2006.01)
*G02B 6/255* (2006.01)
*G02B 6/36* (2006.01)

(52) U.S. Cl.
CPC ............... *G02B 6/46* (2013.01); *G02B 6/2555* (2013.01); *G02B 6/3616* (2013.01)

(58) Field of Classification Search
None
See application file for complete search history.

(56) References Cited

U.S. PATENT DOCUMENTS

| | | | | |
|---|---|---|---|---|
| 2003/0007769 A1* | 1/2003 | Anderson | ...................... | 385/136 |
| 2003/0113087 A1* | 6/2003 | Lee et al. | ...................... | 385/136 |
| 2007/0053648 A1 | 3/2007 | Sasaki et al. | | |
| 2007/0183733 A1* | 8/2007 | Zheng et al. | ................... | 385/136 |
| 2012/0141085 A1* | 6/2012 | Aoki | ............................. | 385/136 |

FOREIGN PATENT DOCUMENTS

| | | |
|---|---|---|
| JP | 02-089009 A | 3/1990 |
| JP | 08-201641 A | 8/1996 |
| JP | 2000-019339 A | 1/2000 |
| JP | 2000-028842 A | 1/2000 |
| JP | 2000-241652 A | 9/2000 |
| JP | 2002-006167 A | 1/2002 |
| JP | 2005-321644 A | 11/2005 |

(Continued)

OTHER PUBLICATIONS

International Search Report of PCT/JP2011/051250 dated Apr. 5, 2011.
European Search Report in European Application No. 11857100.9 dated Sep. 13, 2013.

(Continued)

*Primary Examiner* — Sung Pak
(74) *Attorney, Agent, or Firm* — Sughrue Mion, PLLC

(57) ABSTRACT

A device for setting an optical fiber in place is comprised of: a pedestal capable of supporting the optical fiber; a clamper having the optical fiber gripped between the clamper and the pedestal; and a pressure device having a first elastic member bearing a first load area, a second elastic member bearing a second load area distinct from the first load area, and a limiter device limiting a deformation range of the second elastic member, the pressure device being so linked with the clamper as to, in the deformation range, cause the second elastic member to pressurize the clamper, and, after reaching a limit of the deformation range, cause the first elastic member to pressurize the clamper.

5 Claims, 5 Drawing Sheets

(56) References Cited

FOREIGN PATENT DOCUMENTS

| JP | 2007-072080 A | 3/2007 |
|---|---|---|
| JP | 2008-070704 A | 3/2008 |

OTHER PUBLICATIONS

Communication dated Apr. 17, 2015 from the State Intellectual Property Office of the People's Republic of China in counterpart application No. 201180031758.6.

* cited by examiner

OPTICAL FIBER CLAMP AND METHOD OF CLAMPING OPTICAL FIBER

CROSS-REFERENCE TO RELATED APPLICATIONS

This application is a Continuation Application of PCT International Application No. PCT/JP2011/051250 (filed Jan. 24, 2011) designating the United States, the entire contents of which are incorporated herein by reference.

BACKGROUND OF THE INVENTION

1. Field of the Invention

The present invention relates to an optical fiber clamp and a method of clamping an optical fiber used at a time of fusing and splicing end faces of two optical fibers.

2. Description of the Related Art

To splice end faces of two optical fibers, it is required to clamp these fibers without displacement.

Related arts are disclosed in Japanese Patent Applications Laid-open No. H08-201641, No. 2000-241652, No. 2008-70704, and No. 2002-6167.

SUMMARY OF THE INVENTION

According to any of known clamps, at a time of being used to clamp an optical fiber, the optical fiber often gets out of a desired location or often twists.

The present invention is intended to provide a device and a method capable of setting an optical fiber precisely in place without any complex structures or control means.

According to an aspect of the present invention, a device for setting an optical fiber in place is comprised of: a pedestal capable of supporting the optical fiber; a clamper having the optical fiber gripped between the clamper and the pedestal; and a pressure device having a first elastic member bearing a first load area, a second elastic member bearing a second load area distinct from the first load area, and a limiter device limiting a deformation range of the second elastic member, the pressure device being so linked with the clamper as to, in the deformation range, cause the second elastic member to pressurize the clamper, and, after reaching a limit of the deformation range, cause the first elastic member to pressurize the clamper.

The present invention enables setting an optical fiber precisely in place without any complex structures or control means.

BRIEF DESCRIPTION OF THE DRAWINGS

FIGS. 2A and 2B are cross sectional drawings of the optical fiber clamp of a first embodiment, wherein FIG. 2A shows a state where a pressure for pressing the optical fiber against a fiber placement pedestal by a clamper is set to be low, and FIG. 2B shows a state where the pressure for pressing the optical fiber against the fiber placement pedestal by the clamper is set to be high.

FIGS. 4A and 4B are cross sectional drawings of the optical fiber clamp of a second embodiment, wherein FIG. 4A shows a state where a pressure for pressing the optical fiber against a fiber placement pedestal by a clamper is set to be low, and FIG. 4B shows a state where the pressure for pressing the optical fiber against the fiber placement pedestal by the clamper is set to be high.

BRIEF DESCRIPTION OF THE DRAWINGS

Exemplary embodiments of the present invention will be described hereinafter with reference to the appended drawings.

First Embodiment

First an optical fiber clamp and a method using the same will be described hereinafter with reference to FIGS. 1, 2A and 2B.

The optical fiber clamp of the first embodiment is preferably applied to an optical fiber fusion splicer by which end faces of two optical fibers are fused and spliced. This is, for instance, applicable to a clamp mechanism for the optical fiber fusion splicer. This is applicable to ordinary optical fibers, polarization maintaining optical fibers, or optical fibers of any other types.

Figure 1:
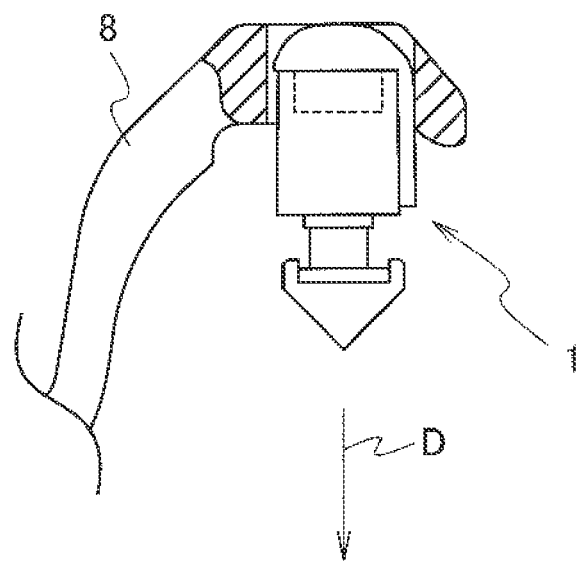
FIG. 1 is a schematic drawing of an optical fiber clamp of any of the present embodiments and a structure for elevating the optical fiber clamp up or down a predetermined position.

The optical fiber clamp 1 is, as shown in FIG. 1, attached to a clamp elevation mechanism 8 provided in the optical fiber fusion splicer. The clamp elevation mechanism 8 is so structured as to move up and down in a direction coming closer to and away from a fiber positioning pedestal 11 shown in FIGS. 2A and 2B. An arrow D in FIG. 1 shows a direction where the optical fiber clamp 1 descends.

Figure 2:
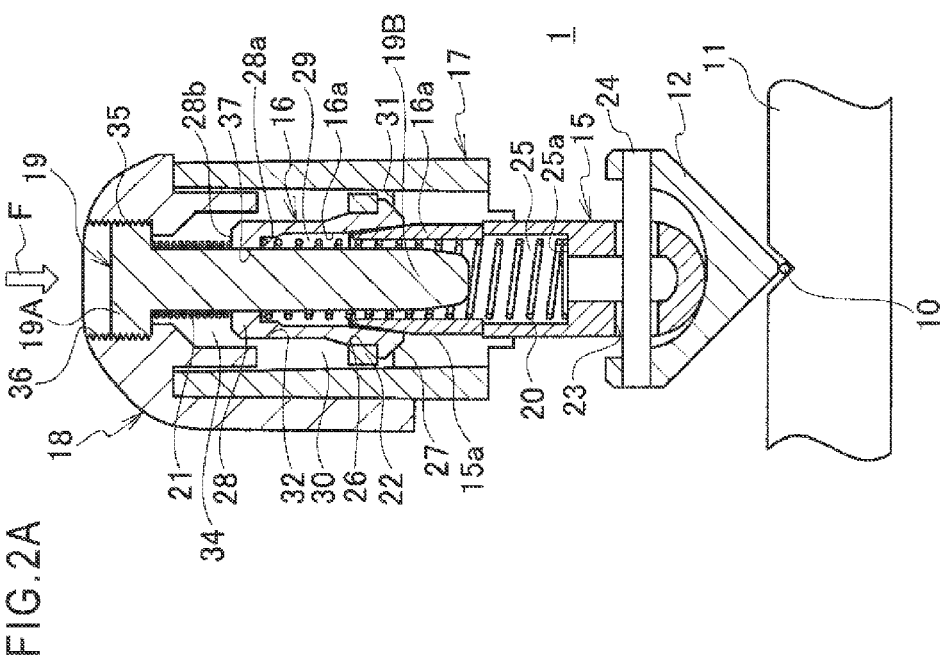

The optical fiber clamp 1, as shown in FIGS. 2A and 2B, has the fiber positioning pedestal 11 for setting an optical fiber 10 in place, a clamper 12 for pressing downward and thereby fixing the optical fiber 10 placed on the fiber positioning pedestal 11, and a pressure variation means for varying pressure to press the clamper 12 against the optical fiber 10 against the optical fiber positioning pedestal 11 in a graded way.

The fiber positioning pedestal 11 is a pedestal formed in a unitary body having a V-notch in which the optical fiber 10 is placed. The clamper 12 has a tip with a flat face by which the optical fiber 10 is pressed against the fiber positioning pedestal 11.

The pressure variation means is comprised of a clamper supporting member 15, a spacer 16, a holder 17, a cover 18, a guide pin 19, a first spring 20 as an elastic member having a load area with high load disposed between the clamper supporting member 15 and the spacer 16, and a second spring 21 as an elastic member having a load area with low load disposed in series with the first spring 20.

The clamper supporting member 15 has the clamper 12 attached to its tip portion and is formed in a cylindrical shape having a flange portion 22 at its proximal end portion. At the tip portion of the clamper supporting member 15 formed is a shaft insertion hole 23 that horizontally penetrates the member. The shaft insertion hole 23 is so structured that a shaft 24 attached to the clamper 12 is inserted into and passes through the hole. The clamper 12 is thereby movably attached to the tip portion of the clamper supporting member 15 via the shaft 24.

In the clamper supporting member 15 formed is a spring housing space portion 25 for housing the first spring 20 therein. One end of the first spring 20 is pressed against a bottom face 25a of this spring housing space portion 25.

In the flange portion 22 of the clamper supporting member 15 formed is a circular hole 26 which in its thickness direction penetrates the flange portion.

The spacer 16 at its tip has a detent portion 27 as a stopper and at its proximal end portion has a roof portion 28. This is as a whole formed in a cylindrical shape like as an inverted bucket. The detent portion 27 passes through the circular hole 26 formed in the flange portion 22 to be settled below the flange portion 22, and thereby latches on the flange portion 22 to prevent separation of the spacer 16 from the clamper supporting member 15.

Further the spacer 16 is, as having an internal periphery 16a of its tip portion in sliding contact with an external periphery 15a of the clamper supporting member 15, guided by the external periphery 15a to be slidable upward and downward relative to the clamper supporting member 15.

Further in the spacer 16 formed is a spring housing space portion 29 for housing the first spring 20. The other end of the first spring 20 is pressed against an internal face 28a of the roof portion of the spring housing space portion 29.

The holder 17 is formed in a cylindrical shape having a housing space portion 30 for at least housing the spacer and the proximal portion of the clamper supporting member 15. In this housing space portion 30 formed is a step portion 31 that receives the flange portion 22 of the clamper supporting member 15 to support the clamper supporting member 15.

The cover 18 is attached to the holder 17 in such a way as to cover the upper portion of the holder 17. In the cover 18 formed is a spring housing space portion 34 for housing and placing the second spring 21 and the guide pin 19. Further in the cover 18 formed is a position regulating screw portion 36 into which a screw portion 35 formed around the periphery of a head portion 19A of the guide pin 19 is screwed so as to enable regulation of a position where the guide pin 19 is attached relative to the cover 18.

The guide pin 19 has the head portion 19A having the screw portion 35 around its periphery and a body portion 19B forming a columnar shape. The guide pin 19 is so formed that it is inserted into a hole portion 37 formed on a roof portion top face 28b of the spacer 16 and then the body portion 19B intrudes into the spring housing space portion 25 of the clamper supporting member 15.

The first spring 20 is attached to the outer periphery of the body portion 19B of the guide pin 19 and as well makes its both ends in contact with the bottom internal face 25a of this spring housing space portion 25 of the clamper supporting member 15 and the internal face 28a of the roof portion of the spring housing space portion 29 respectively, thereby being disposed between the clamper supporting member 15 and the spacer 16. This first spring 20 is a compression coil spring with higher repulsive force having a load area of higher load than that of a second spring 21 as described later as it is compressed in advance.

Further the first spring 20 is disposed in a state of already being compressed between the clamper supporting member 15 and the spacer 16, and its degree of compression is made constant as the detent portion 27 of the spacer 16 latches on the flange portion 22 of the clamper supporting member 15.

The second spring 21 is attached to the outer periphery of the body portion 19B of the guide pin 19 and as well makes its both ends in contact with the head portion 19A of the guide pin 19 and the top face 28b of the spacer 19 respectively, thereby being disposed therebetween. This second spring 21 is, as being disposed in series in this way, disposed in series with the first spring 20. This second spring 21 is a compression coil spring with lower repulsive force having a load area of lower load than that of the first spring 20. In other words, a relation W1>W2 is established where the load by the first spring 20 is W1 and the lower load by the second spring 21 is W2.

Further the second spring 21 is so structured as to be compressed by turning the head portion 19A of the guide pin 19 by means of a drive or such to retract the guide pin 19. More specifically, the screw portion 35 as a limiter device regulates the degree of compression of the second spring 21, consequently limits a deformation range of the second spring 21, and further makes an initial load applied to the optical fiber 10 to be variable.

As the first spring 20 and the second spring 21 respectively having distinct load areas from each other are arranged in series, the pressure variation means structured in a way as described above first puts the second spring 21 having a lower load area in action and next puts the first spring 20 having a higher load area in action, thereby changing pressure from low to high in a graded way.

To be more concrete, in the optical fiber clamp of the first embodiment, if a load F pressing the cover 18 acts on the device in a state where the clamper 12 is in contact with the optical fiber 10 placed on the fiber positioning pedestal 11, first the second spring 21 having the lower load area is compressed to give pressure by this lower load of the second spring 21 to the optical fiber 10. This state is shown in FIG. 2A. When the degree of compression of the second spring 21 thereafter reaches its limit, the detent portion 27 of the spacer 16 is released from the flange portion 22 of the clamper supporting member 15 and therefore the spacer 16 is pressed down so that the first spring 20 is compressed to give pressure by this higher load of the first spring 20 to the optical fiber 10. In other words, clamping load by the lower load by the second spring 21 first acts on the optical fiber 10 and clamping load by the higher load by the first spring 20 next acts on the optical fiber 10.

Figure 3:
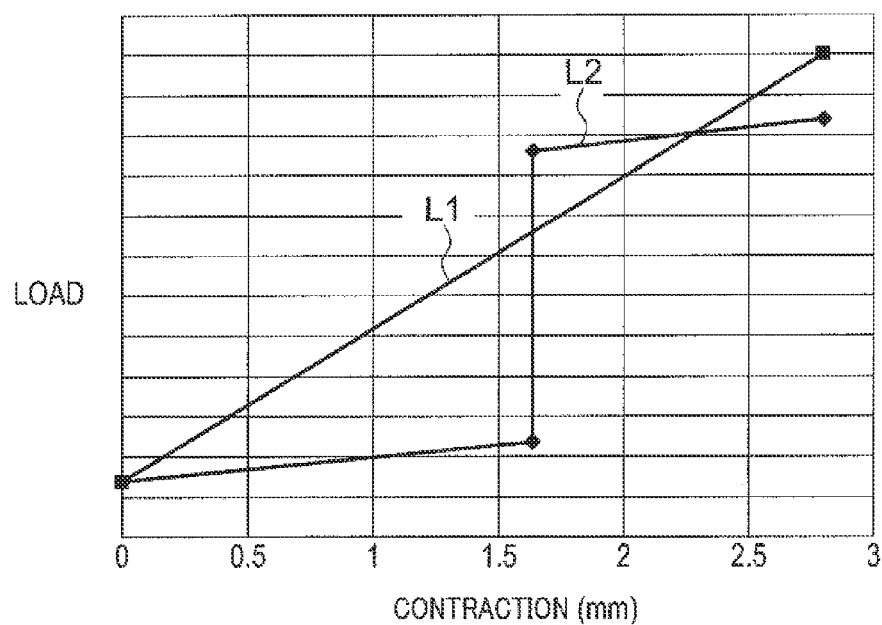
FIG. 3 is a property graph showing changes in load by the optical fiber clamp of FIGS. 2A and 2B.

FIG. 3 shows change in clamping load. In FIG. 3, the line L1 depicts change in clamping load when only one spring is used, and the line L2 depicts change in clamping load when two springs are used as in the optical fiber clamp of the first embodiment. In the optical fiber clamp of the first embodiment, by means of two springs, namely the first spring 20 and the second spring 21, arranged in series on a line, pressure applied to the optical fiber 10 can be changed not in a linear way but in a graded way. Further, as the load by the second spring 21 is made lower than a load by only one spring, the device create an effect that it is avoided to place the optical fiber 10 under relatively high pressure and therefore give a damage thereto.

As a structure in that two springs are arranged in series as in the optical fiber clamp of the first embodiment is used, clamping load can be drastically increased at a desired point that can be determined by controlling the degrees of compression of the first spring 20 and the second spring 21 and these spring moduli. In particular the optical fiber clamp of the first embodiment, as the first spring 20 is provided with a degree of compression given in advance, realizes drastic load change (the part where the line L2 drastically leaps upward) when the first spring 20 starts acting.

Moreover, the optical fiber clamp of the first embodiment can produce high load even if a spring with a small spring modulus is used, and can exert steady load with small change in load even if the degree of compression is slightly changed.

Further the optical fiber clamp of the first embodiment can change a target value of load to any degree by changing the spring moduli of the first spring 20 and the second spring 21 and changing the degree of compression of the first spring 20.

Next, a method of clamping the optical fiber 10 by using the optical fiber clamp of the first embodiment will be described hereinafter.

The optical fiber clamp 1 is first moved just above the optical fiber 10. As the whole of the optical fiber clamp 1 is next moved down toward the optical fiber 10 by means of the clamp elevation mechanism 8, the clamper 12 of the optical fiber clamp 1 comes in contact with the optical fiber 10. After the clamper 12 comes in contact with the optical fiber 10, the holder 17, the cover 18, and the guide pin 19 commonly continues to go down. The second spring 21 is consequently, as shown in FIG. 2A, compressed so that its pressure acts as a clamping load to press the optical fiber 10 against the fiber placing pedestal 11. In this state, only the low load of the second spring 21 acts on the optical fiber 10.

During the clamping load by the second spring 21 acts on the optical fiber 10, as the detent portion 27 of the spacer 16 keeps latching on the flange portion 22 of the clamper supporting member 15, the load by the first spring 20 does not act on the optical fiber 10.

Then, when the second spring 21 is compressed to reach its limit, the detent portion 27 of the spacer 16 is released from the flange 22. The spacer 16, as the internal periphery 16a of its tip portion is in slidable contact with the external periphery 15a of the clamper supporting member 15, slides downward relative to the clamper supporting member 15. Consequently, as shown in FIG. 2B, the first spring 20 is compressed by being pressed by the spacer 16, and the pressure by the first spring 20 in turn acts as a clamping load to press the optical fiber 10 against the fiber placing pedestal 11. In this state, the degree of compression reaches its limit because each coil rests of the second spring 21 against its neighbor. Thus only the high load by the first spring 20 acts on the optical fiber 10.

Consequently, according to two springs of the first spring 20 and the second spring 21 having distinct load areas, the second spring 21 having the load area of the low load first comes into action and the first spring 20 having the load area of the high load next comes into action, so that the load on the clamper 12 changes in a graded way from the low load to the high load, when clamping the optical fiber 10.

According to any of known clamps, at a time of being used to clamp an optical fiber, the optical fiber often gets out of a desired location or often twists. According to studies by the present inventors, this problem comes from a fact that an optimal load on a clamp varies depending on factors such as a diameter of the optical fiber. According to the first embodiment, as the optical fiber 10 is clamped with changing the load on the clamp 12 from the low load to the high load in a graded way, dislocation and twisting hardly occur. In a case where optical fibers being different in diameter, or polarization maintaining optical fibers, are fused and spliced, the device and the method do not give damages to the optical fiber 10 and do not cause dislocation. As being free from dislocation and twisting, it is enabled to suppress transmission loss at the spliced part.

According to the first embodiment, as it is so constituted that two of the first spring 20 and the second spring 21 having distinct load areas are arranged in series so as to make the second spring 21 having a low load area to act and the first spring 20 having a high load area to act in this order, thereby changing the pressure from low to high in a graded way, it does not require other means such as an electromagnet or a rack-and-pinion mechanism, more specifically employs a simple structure, to clamp the optical fiber 10 with greatly changing the clamping load. Thus, not only to an ordinary optical fiber but also to a polarization maintaining optical fibers, it applies an optimal clamping load in accordance with its diameter when clamping the optical fiber 10.

Further according to the first embodiment, as it is so constituted that the detent portion 27 of the spacer 16 is released from the flange portion 22, then the spacer 16 is pressed down so as to compress the first spring 20, and then the high load by the first spring 20 is applied to the subject, the simple structure by the release of lock of the spacer 16 enables changing the clamping load.

Further according to the first embodiment, as the first spring 20 is so disposed as to have the degree of compression at the initial state, great change in load is realized when the first spring 20 starts to act.

Further according to the first embodiment, as the second spring 21 is compressed by rotating the head portion 19A of the guide pin 19 to press the guide pin 19 down, so as to enable change of the initial load applied to the optical fiber 10, the initial load applied to the optical fiber 10 can be freely changed in accordance with the diameter of the optical fiber 10.

Second Embodiment

Next, the second embodiment will be described with reference to FIGS. 4A and 4B. In the second embodiment, detailed descriptions about components identical to those of the optical fiber clamp of the first embodiment will be omitted while the identical reference numerals are attached thereto. Descriptions will be given only about distinct components.

An optical fiber clamp of the second embodiment shares a common basic constitution with that of the first embodiment but differs from the first embodiment in that the first spring 20 is not in advance compressed to some degree to bear a load and is thus made to produce great change in load when the first spring 20 starts to act. The optical fiber clamp of the second embodiment, on the basis of the structural differences, differs from the optical fiber clamp of the first embodiment in the following points.

Figure 4:
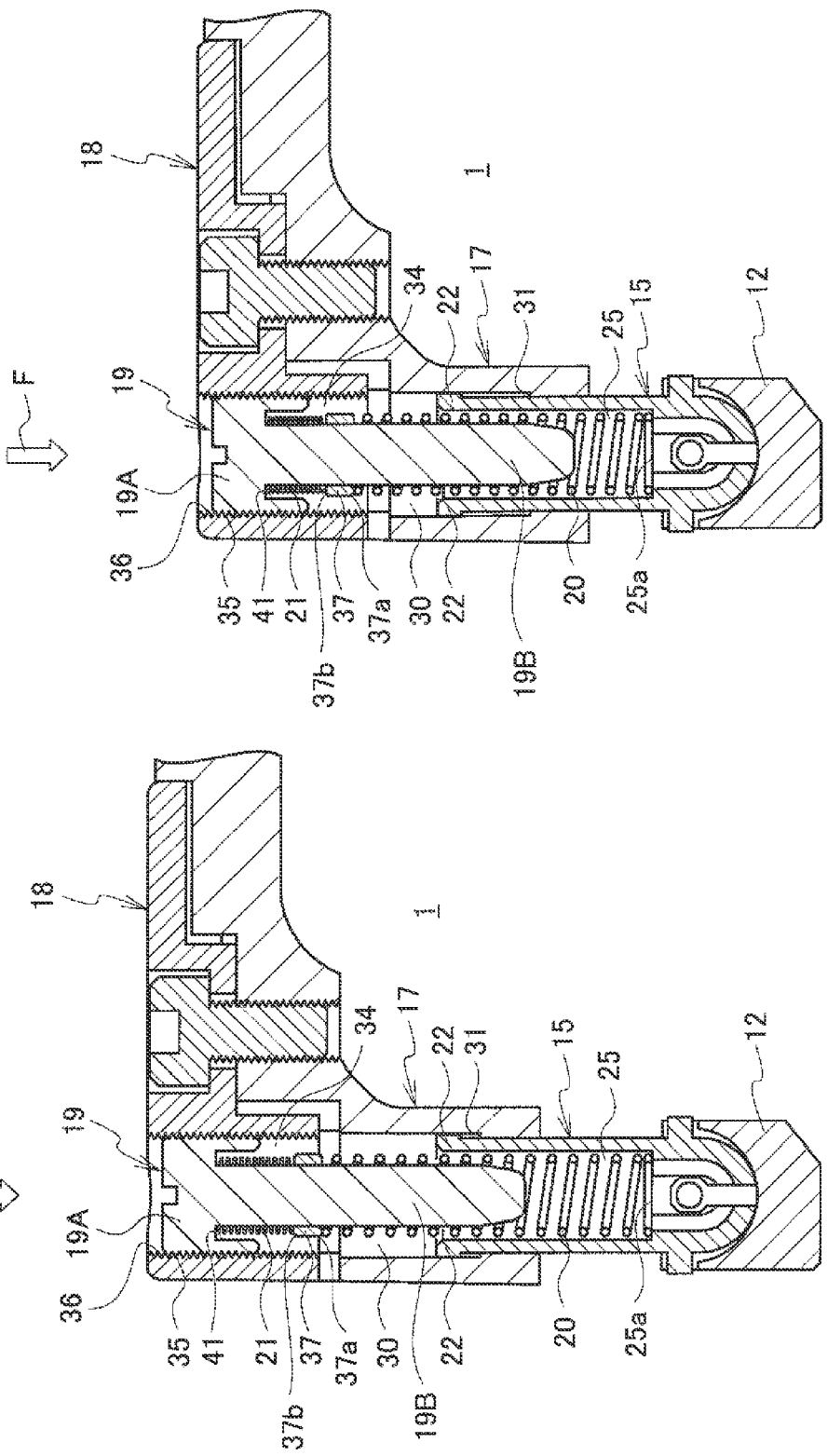

The pressure variation means of the optical fiber clamp 1 of the second embodiment is, as shown in FIGS. 4A and 4B, comprised of a clamper supporting member 15, a holder 17, a cover 18, a guide pin 19, a spacer 37 having distinct functions from that of the first embodiment, a first spring 20 as an elastic member having a high load area disposed between the clamper supporting member 15 and the spacer 37, and a second spring 21 as an elastic member having a low load area disposed in series with the first spring 20.

The clamper supporting member 15 of the second embodiment is similar to that of the first embodiment in that the clamper 12 is attached to its tip portion and is formed to be a cylindrical shape having the flange portion 22 at its proximal end portion. The clamper 12 is identical to that shown in FIGS. 2A and 2B of the first embodiment while FIGS. 4A and 4B show views from a different viewpoint. The clamper 12 of FIGS. 4A and 4B show sections perpendicular to the sections of FIGS. 2A and 2B.

The holder 17 of the second embodiment has a housing space portion 30 housing the proximal end portion of the clamper supporting member 15. In the housing space portion formed is a step portion 31 that receives the flange portion 22 of the clamper supporting member 15 to support the clamper supporting member 15.

In the cover 18 formed is a spring housing space portion 34 for housing and placing the second spring 21 and the guide pin 19. Further in the cover 18 formed is a position regulating screw portion 36 into which a screw portion 35 formed around the periphery of a head portion 19A of the guide pin 19 is screwed so as to enable regulation of a position where the guide pin 19 is attached relative to the cover 18.

The guide pin 19 has the head portion 19A having the screw portion 35 around its periphery and a body portion 19B forming a columnar shape. This guide pin 19 is so formed that the body portion 19B intrudes into the spring housing space portion 25 of the clamper supporting member 15. Further the guide pin 19 has a circular slot 41 for making the head portion 19A to house the second spring 21.

The spacer 37 is formed in a ring shape distinct from that of the first embodiment. And, the spacer 37 is attached to the outer periphery of the body portion 19B of the guide pin 19 and is also made movable upward and downward relative to the body portion 19B.

The first spring 20 of the second embodiment is attached to the outer periphery of the body portion 19B of the guide pin 19, and further has its both ends in contact with a bottom face 25a of the spring housing space portion 25 and a lower face 37a of the spacer 37 respectively, thereby being disposed between the clamper supporting member 15 and the spacer 37. This first spring 20 is a compression coil spring with higher repulsive force having a load area of higher load than that of a second spring 21 as described later.

The second spring 21 of the second embodiment is attached to the outer periphery of the body portion 19B of the guide pin 19, and further has its both ends in contact with the circular slot 41 formed in the head portion 19A of the guide pin 19 and an upper face 37b of the spacer 37 respectively, thereby being disposed therebetween. The second spring 21, as being disposed in this way, arranged in series with the first spring 20. This second spring 21 is a compression coils spring with lower repulsive force having a load area of lower load than that of the first spring 20.

Further the second spring 21 is so structure as to be compressed by turning the head portion 19A of the guide pin 19 to retract the guide pin 19 by means of a drive or such. Therefore the second spring 21 mainly makes an initial load applied to the optical fiber 10 to be variable by turning the guide pin 19 to retract it.

As the first spring 20 and the second spring 21 respectively having distinct load areas from each other are arranged in series, the pressure variation means structured in a way as described above first puts the second spring 21 having a lower load area in action and next puts the first spring 20 having a higher load area in action, thereby changing pressure from low to high in a graded way.

To be more concrete, in the optical fiber clamp of the second embodiment, if a load F pressing the cover 18 acts on the device in a state where the clamper 12 is in contact with the optical fiber 10 placed on the fiber positioning pedestal 11, first the second spring 21 having the lower load area is mainly compressed to give pressure by this lower load of the second spring 21 to the optical fiber 10. This state is shown in FIG. 4A. When the degree of compression of the second spring 21 thereafter reaches its limit, the first spring 20 is next compressed to give pressure by this higher load of the first spring 20 to the optical fiber 10. In other words, clamping load by the lower load by the second spring 21 first acts on the optical fiber 10 and clamping load by the higher load by the first spring 20 next acts on the optical fiber 10.

Figure 5:
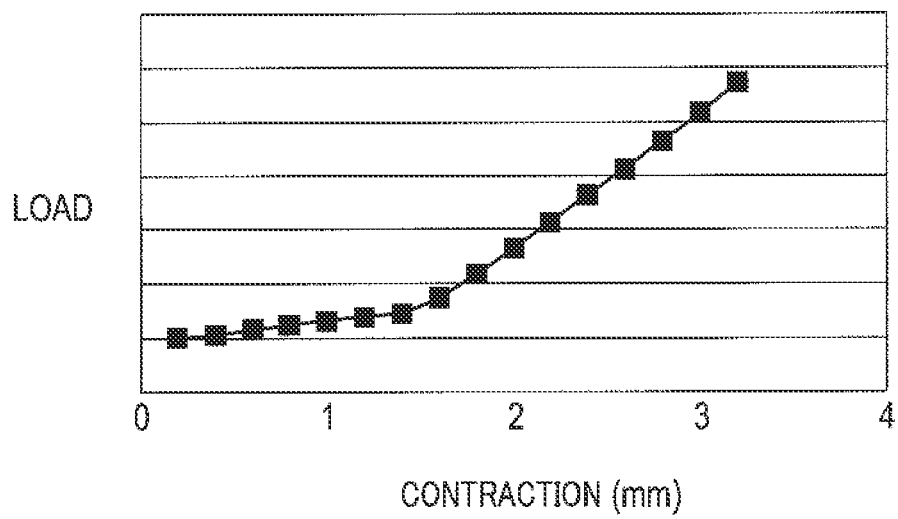
FIG. 5 is a property graph showing changes in load by the optical fiber clamp of FIGS. 4A and 4B.

FIG. 5 shows change in clamping load. The optical fiber clamp of the second embodiment, by using two of the first spring 20 and the second spring 21 arranged in line, can change pressure applied to the optical fiber 10 not in a linear way but in such a way that the slope of the load change suddenly changes at a certain point.

As the optical fiber clamp of the second embodiment employs a structure in that two springs are arranged in series as with the first embodiment, clamping load can be drastically increased at a desired point that can be determined by controlling the degrees of compression of the first spring 20 and the second spring 21 and these spring moduli. As being understood from the changes in clamping load of FIG. 5, when the sinking degree of the clamp (the degree of compression of the springs) is about 1 mm, the load stays to be about one fold, when the sinking degree of the clamp is 3 mm, the load becomes about five fold. By the optical fiber clamp of the second embodiment, while the stroke is the same, if the spacer 37 is disposed at a lower point, lower by 3 mm for example, the device can be manually changed into a mode of the high load area.

Meanwhile the optical fiber clamp of the second embodiment is so designed that it exerts one fold load when the second spring 21 of the low load is in action and about five fold load when the first spring 20 of the high load is in action, at a time when the degree of compression is 3 mm.

Next, a method of clamping the optical fiber 10 by using the optical fiber clamp of the second embodiment will be described hereinafter.

The optical fiber clamp 1 is first moved just above the optical fiber 10. As the whole of the optical fiber clamp 1 is next moved down toward the optical fiber 10 by means of the clamp elevation mechanism 8, the clamper 12 of the optical fiber clamp 1 comes in contact with the optical fiber 10. After the clamper 12 comes in contact with the optical fiber 10, the holder 17, the cover 18, and the guide pin 19 commonly continues to go down. The second spring 21 is consequently, as shown in FIG. 4A, compressed so that its pressure acts as a clamping load to press the optical fiber 10 against the fiber placing pedestal 11. In this state, only the low load of the second spring 21 acts on the optical fiber 10.

During the clamping load by the second spring 21 acts on the optical fiber 10, the load by the first spring 20 does not act on the optical fiber 10.

Then, when the second spring 21 is compressed to its limit, the holder 17, the cover 18 and the guide pin 19, as the clamper supporting member 15 functions as a guide, go down together. Consequently, as shown in FIG. 4B, the first spring 20 is compressed and the pressure by the first spring 20 in turn acts as a clamping load to press the optical fiber 10 against the fiber placing pedestal 11. In this state, because each coil of the second spring 21 rests against its neighbor and the degree of compression reaches its limit, the high load by the first spring 20 acts on the optical fiber 10.

Consequently, according to two springs of the first spring 20 and the second spring 21 having distinct load areas, the second spring 21 having the load area of the low load first operates and the first spring 20 having the load area of the high load next operates, so that the load on the clamper 12 changes in a graded way from the low load to the high load, when clamping the optical fiber 10.

According to the method of clamping an optical fiber of the second embodiment, as with the first embodiment, as the device is so structured as to make the second spring 21 having a low load area to act and next the first spring 20 having a high load area to act in this order to clamp the optical fiber 10, the optical fiber 10 can be clamped without damaging the optical fiber 10 and with preventing dislocation of the optical fiber 10 when optical fibers having distinct diameters or polarization maintaining optical fibers are to be fused and spliced. Therefore, according to the second embodiment, it is enabled to suppress connection loss (transmission loss) of the spliced optical fiber 10.

According to the second embodiment, as it is so constituted that two of the first spring 20 and the second spring 21 having distinct load areas are arranged in series so as to make the second spring 21 having a low load area to come into action and the first spring 20 having a high load area to come into action in this order, thereby changing the pressure from low to high in a graded way, it does not require other means such as an electromagnet or a rack-and-pinion mechanism, more specifically employs a simple structure, to clamp the optical fiber 10 with greatly changing the clamping load. Thus, not only to ordinary optical fibers but also to polarization maintaining optical fibers, it applies an optimal clamping load in accordance with its diameter when clamping the optical fiber 10.

Further according to the second embodiment, as the second spring 21 is compressed by rotating the head portion 19A of the guide pin 19 to press the guide pin 19 down, thereby enabling change of the initial load applied to the optical fiber 10, the initial load applied to the optical fiber 10 can be freely changed in accordance with the diameter of the optical fiber 10.

Other Embodiments

While, in any of the optical fiber clamps of the first and second embodiments, two springs are used and arranged in series, three or more springs may be arranged in order to control the clamping load with a plurality of grades.

Further, as the first spring 20 and the second spring 21 used in the first and second embodiments, irregular pitch springs or conical springs for example may be used. These springs change load in non-linear ways depending on the degree of compression and thus make the clamping load to be variable in a further wider range.

Further, while the detent portion 27 as a stopper is formed on the spacer 16 and is made to latch on the flange portion 22 of the clamp supporting member 15 in the first embodiment, to the contrary, not shown in the drawings, it may be modified so that a detent portion 27 is formed on the clamp supporting member 15 and is made to latch on the spacer 16, thereby releasing the spacer 16 when the second spring 21 is compressed to the limit of its deformation range.

Although the invention has been described above by reference to certain exemplary embodiments of the invention, the invention is not limited to the exemplary embodiments described above. Modifications and variations of the embodiments described above will occur to those skilled in the art, in light of the above teachings.

INDUSTRIAL APPLICABILITY

The present invention provides a device of setting an optical fiber precisely in place at a time of fusing and splicing end faces of two optical fibers.

What is claimed is:

1. A device for setting an optical fiber in place, comprising:
a pedestal capable of supporting the optical fiber;
a clamper having the optical fiber gripped between the clamper and the pedestal; and
a pressure device capable of pressing the clamper so as to pressurize the optical fiber to the pedestal,
wherein the pressure device comprises a first elastic member bearing a first clamping load, a second elastic member bearing a second clamping load less than the first clamping load, and a limiter device limiting a deformation range of the second elastic member,
wherein the second elastic member is first compressed when a load acts on the pressure device by the second clamping load of the second elastic member, and, after the second elastic member reaches a limit of a degree of compression, the first elastic member is compressed by the first clamping load of the first elastic member.

2. A device for setting an optical fiber in place, comprising:
a pedestal capable of supporting the optical fiber;
a clamper having the optical fiber gripped between the clamper and the pedestal; and
a pressure device having a first elastic member bearing a first load area, a second elastic member bearing a second load area distinct from the first load area, and a limiter device limiting a deformation range of the second elastic member, the pressure device being so linked with the clamper as to, in the deformation range, cause the second elastic member to pressurize the clamper, and, after reaching a limit of the deformation range, cause the first elastic member to pressurize the clamper,
wherein the pressure device comprises a support member configured to support the clamper, a spacer slidably fitting with the support member, and a stopper configured to temporarily fix the spacer with the support member;
wherein the first elastic member is interposed between the support member and the spacer to press the support member;
wherein the second elastic member is so disposed as to press the spacer; and
wherein the stopper is so engaged with the spacer or the support member as to release the spacer when the second elastic member is compressed to reach the limit of the deformation range.

3. The device of claim 1, wherein the first elastic member is compressed in advance.

4. The device of claim 1, wherein the limiter device comprises a screw for regulating a degree of compression of the second elastic member.

5. A method for setting an optical fiber in place, comprising:
supporting the optical fiber on a pedestal;
gripping the optical fiber between a clamper and the pedestal; and
using a pressure device having a first elastic member bearing a first clamping load, a second elastic member bearing a second clamping load less than the first clamping load, and a limiter device limiting a deformation range of the second elastic member, first compressing the second elastic member when a load acts on the pressure device by the second clamping load of the second elastic member, and, after the second elastic member reaches a limit of a degree of compression, compressing cause the first elastic member by the first clamping load of the first elastic member.

* * * * *